United States Patent
Jansen et al.

(10) Patent No.: US 6,698,087 B2
(45) Date of Patent: Mar. 2, 2004

(54) ACTUATOR HAVING THREE BRIDGES

(75) Inventors: Norbert Erwin Therenzo Jansen, Eindhoven (NL); Erik Cornelis Maria Verhoeven, Eindhoven (NL); Jan Hermannus Post, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 143 days.

(21) Appl. No.: 09/734,822

(22) Filed: Dec. 12, 2000

(65) Prior Publication Data

US 2001/0013259 A1 Aug. 16, 2001

(30) Foreign Application Priority Data

Dec. 17, 1999 (EP) ............................................. 99204373

(51) Int. Cl.⁷ ............................ B23P 19/00; G11B 5/127
(52) U.S. Cl. ...................................... 29/737; 29/603.03
(58) Field of Search ......................... 29/428, 447, 449, 29/557, 558, 737, 738, 757, 603.03, 603.01; 360/244.8, 204.5, 328–331, 294.4

(56) References Cited

U.S. PATENT DOCUMENTS 5,600,515 A * 2/1997 Mizuno et al. ............. 360/104
5,995,335 A  11/1999 Jurgenson et al. .......... 360/109

FOREIGN PATENT DOCUMENTS

EP          0638895 B1    2/1995
EP          0638895a1     2/1995    ............ G11B/5/56

* cited by examiner

Primary Examiner—John C. Hong
(74) Attorney, Agent, or Firm—Michael E. Belk

(57) ABSTRACT

An actuator having two parts (3, 5) which extend in a main plane and are mutually connected by three bridges (7, 9, 11). The bridges can be shortened in respective shortening (Y1, Y2, Y3) directions parallel to the main plane by local heating and subsequent cooling down of the bridges. According to the invention, the shortening directions of the three bridges are parallel, and the two parts of the actuator are rotated relative to one another about an axis of rotation (21, 23) extending perpendicularly to the main plane through alternate shortening of two adjacent bridges (7, 9 or 9, 11) of the three bridges. The two parts of the actuator can be rotated relative to one another in two opposite directions.

20 Claims, 3 Drawing Sheets

ACTUATOR HAVING THREE BRIDGES

Figure 1:
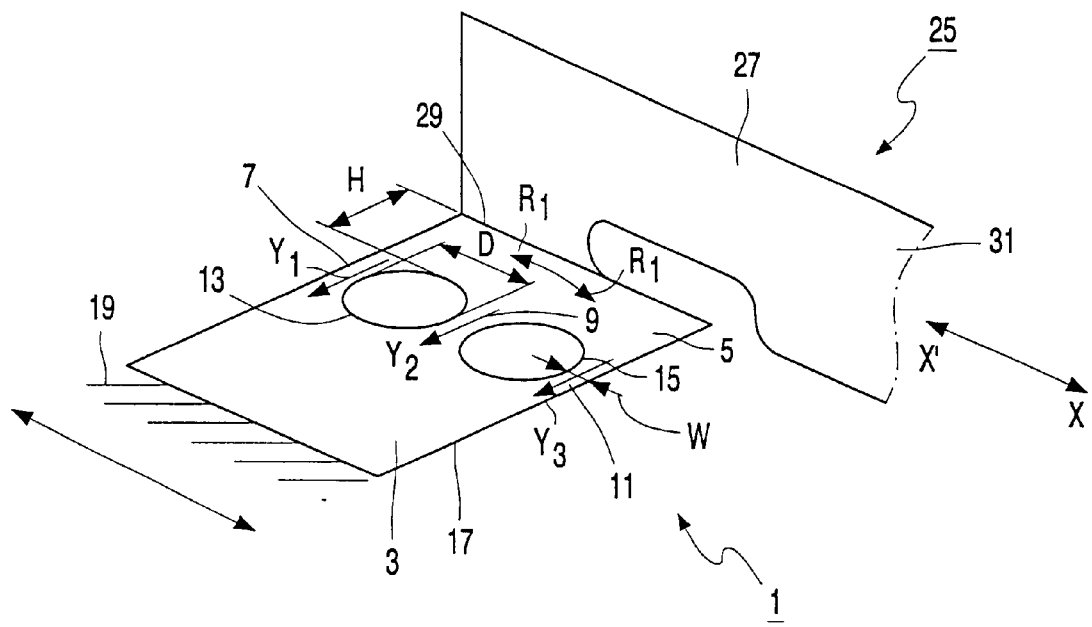

The invention relates to a method of positioning a component in a device by means of an actuator, which actuator is provided with two parts which extend in a main plane and are interconnected by means of three bridges, which three bridges can each be shortened in a shortening direction which extends parallel to the main plane in that the bridge is locally heated and subsequently cooled down, in which method the two parts of the actuator are rotated relative to one another about an axis of rotation extending substantially perpendicularly to the main plane through shortening of at least one of said three bridges.

The invention also relates to an actuator suitable for use in such a method, which actuator is provided with two parts which extend in a main plane and are interconnected by means of three bridges, which three bridges can each be shortened in a shortening direction extending parallel to the main plane through local heating of the bridge and subsequent cooling down, while the two parts are rotatable relative to one another about an axis of rotation extending substantially perpendicularly to the main plane through shortening of at least one of said three bridges.

A method and an actuator of the kinds mentioned in the opening paragraphs are known from EP-B-0 638 895. The two parts of the known actuator are plate-shaped and extend in the main plane. The three bridges have the shape of strips and also extend in the main plane. As seen in the main plane, the three bridges are mutually positioned in a kind of timber frame arrangement, a first and a second bridge of the three extending substantially parallel to one another and the third bridge extending obliquely between the two other bridges. According to the known method, the two parts of the actuator are rotated relative to one another in that the first bridge is shortened. This is done through local heating of the first bridge by means of a laser beam and subsequent cooling down. Since the first bridge is shortened, the two parts of the actuator are rotated relative to one another through a very limited angle about an axis of rotation which extends substantially perpendicularly to the main plane and which passes substantially through a point of intersection of the second and the third bridge. Said angle is increased in that this process is repeated a number of times. The two parts of the actuator are rotated in an opposite direction relative to one another about an axis of rotation which passes substantially through a point of intersection of the first and the third bridge in that the second bridge is shortened. Since the actuator has a high rigidity, as seen in the main plane, and a very limited mutual rotation of the two parts of the actuator is obtained as a result of shortening the bridges, a highly accurate positioning is possible by means of the actuator. An incorrectly adjusted angular rotation can be corrected in either direction in that the two parts of the actuator are rotatable relative to one another in two mutually opposed directions. The known method may be used, for example, for accurately adjusting a position of a component, such as a magnetic scanning unit, in a scanning device for magnetic tape information carriers or of a component in an image recording device, such as a CCD image sensor.

A disadvantage of the known method and the known actuator is that a maximum achievable angle of rotation between the two parts of the known actuator is very limited, so that a positioning of components is possible over very limited distances only by means of the known method. This is because a tensile stress arises in a bridge during shortening of this bridge, which stress increases in proportion as the bridge is further shortened. The yield point of the bridge material is locally strongly reduced during heating of the bridge. If the built-up tensile stress in the bridge becomes greater than this reduced yield point, a renewed heating of the bridge will lower the built-up tensile stress owing to plastic deformation of the heated material, i.e. through a lengthening of the bridge. A further buildup of the tensile stress and a further shortening of the bridge are retarded thereby, or even become impossible.

It is an object of the invention to provide a method and an actuator of the kind mentioned in the opening paragraphs whereby again a positioning in two mutually opposed directions is possible with a comparable accuracy, but whereby a considerably greater maximum angle of rotation between the two parts of the actuator is achievable.

To achieve the above object, a method according to the invention is characterized in that the shortening directions of the three bridges are mutually substantially parallel, and the two parts of the actuator are rotated relative to one another by an alternate shortening of two mutually adjoining bridges of the three bridges.

To achieve the above object, an actuator according to the invention is characterized in that the shortening directions of the three bridges are mutually substantially parallel, and the two parts can be rotated relative to one another by an alternate shortening of two mutually adjoining bridges of the three bridges.

Since two mutually adjoining bridges of the three bridges are shortened, the third bridge is deformed, as seen in the main plane, so that the two parts of the actuator are rotated relative to one another about an axis of rotation directed substantially perpendicularly to the main plane and situated adjacent a central portion of the third bridge. The shortening directions of the three bridges of the actuator according to the invention are mutually substantially parallel, with the result that a tensile stress is built up in the two mutually adjoining bridges during shortening of these two bridges. Since the two adjoining bridges are alternately shortened, i.e. are heated in turn, the yield point is lowered in only one of these two bridges each time. A plastic deformation, i.e. a lengthening of the heated bridge under the influence of the tensile stress built up in this bridge, is prevented to a large extent because the non-heated bridge, which has a comparatively high yield point and shows only elastic deformation as a result, temporarily absorbs the tensile stress present in the heated bridge. A shortening of the bridges, once achieved, is thus largely maintained during a renewed heating of one of the bridges, so that the relevant bridge is further shortened during a renewed cooling-down, and the two parts of the actuator can be rotated relative to one another through a comparatively great angle. The object of the invention is furthermore achieved by means of a simple construction and with limited dimensions of the actuator.

A special embodiment of a method according to the invention is characterized in that the two parts of the actuator are rotated relative to one another in a first direction by an alternate shortening of a first and an adjacent second bridge of the three bridges, and in that the two parts of the actuator are rotated relative to one another in a second direction opposed to the first direction by an alternate shortening of the second and the adjacent third bridge. In this special embodiment, said second bridge lies between the first and the third bridge. When the first and the second bridge are alternately shortened, the third bridge is deformed, as seen in the main plane, so that the two parts of the actuator are rotated relative to one another about a first axis of rotation directed substantially perpendicularly to the main plane and situated between the second bridge and the third bridge. Said first direction is defined by the positions of the first and the second bridge with respect to the third bridge. When the second and the third bridge are alternately shortened, the first bridge is deformed as seen in the main plane, so that the two parts of the actuator are rotated relative to one another about a second axis of rotation directed substantially perpendicularly to the main plane and situated between the first bridge and the second bridge. Said second direction is defined by the positions of the second and the third bridge relative to the first bridge and is opposed to said first direction. A relative rotation of the two parts of the actuator in two mutually opposed directions is thus possible in a simple manner by means of a simple and compact construction of the actuator.

A special embodiment of an actuator according to the invention is characterized in that the bridges have a width, seen perpendicularly to the shortening direction, which is substantially smaller than twice a spot diameter of a laser beam used or designed to be used for shortening the bridges. In this special embodiment, a comparatively large portion of the widths of the bridges is heated by the laser beam, so that a comparatively great shortening of the bridges is achieved in a single heating step. This gives the actuator a high effectivity.

A further embodiment of an actuator according to the invention is characterized in that the width of the bridges is at most equal to the spot diameter. In this further embodiment, the bridges are heated by the laser beam in a substantially uniform manner, seen in the width direction, whereby the effectivity of the actuator is further enhanced.

A yet further embodiment of an actuator according to the invention is characterized in that a distance present between the bridges and the width of the bridges have a same order of magnitude. An angle of rotation through which the two parts of the actuator are rotated relative to one another as a result of a shortening of one of the bridges is smaller in proportion as the distance between the bridges is greater, so a comparatively great relative rotation of the two parts of the actuator is obtained upon each shortening of one of the bridges by means of this yet further embodiment of the actuator according to the invention.

A particular embodiment of an actuator according to the invention is characterized in that a distance present between the bridges is substantially greater than the width of the bridges. In this particular embodiment, a comparatively small, but comparatively very accurate relative rotation of the two parts of the actuator is obtained upon each shortening of one of the bridges.

A further embodiment of an actuator according to the invention is characterized in that the actuator is provided with a coupling member which is fastened to one of the two parts of the actuator at a distance from the bridges as seen parallel to the shortening direction and in a fixed position as seen in a displacement direction directed substantially perpendicularly to the shortening direction, which coupling member is uncoupled from the corresponding part when seen in the rotation direction of the actuator. A mutual rotation of the two parts of the actuator is converted into a translation of the coupling member in said displacement direction by means of said coupling member. Since the two parts of the actuator are mutually rotatable in two opposed directions, the coupling member is displaceable also in a direction opposed to said displacement direction. A transmission ratio obtaining between said translation and said rotation is defined by said distance which is present between the coupling member and the bridges, as seen parallel to the shortening direction.

A still further embodiment of an actuator according to the invention is characterized in that the coupling member comprises a blade spring which extends substantially parallel to the displacement direction and substantially perpendicularly to the main plane. Said blade spring has a comparatively low rigidity as seen in a direction parallel to the shortening direction of the bridges. Owing to this low rigidity, a necessary uncoupling in the rotation direction between the coupling member and the two parts of the actuator is provided in a constructionally particularly simple and effective manner.

A particular embodiment of an actuator according to the invention is characterized in that the two parts of the actuator, the three bridges, and the blade spring are manufactured from a single piece of sheeting, the blade spring being bent from the main plane into a position substantially perpendicular to the main plane. The actuator can thus be manufactured in a simple manner as a single integral component.

Figure 4:
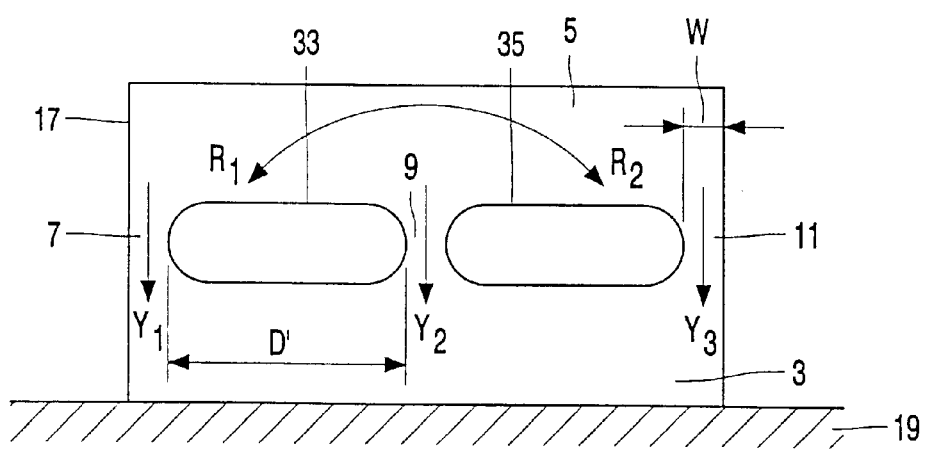
Figure 2:
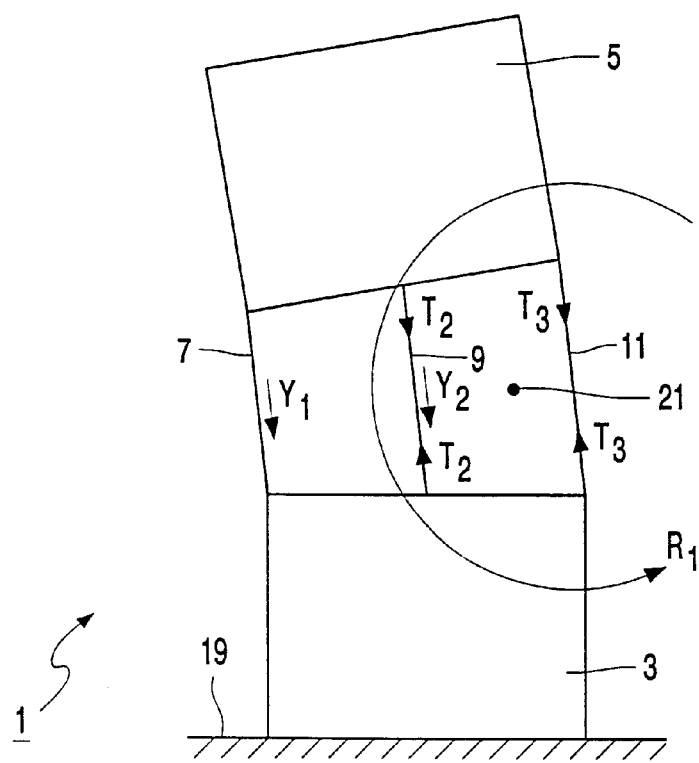
Figure 3:
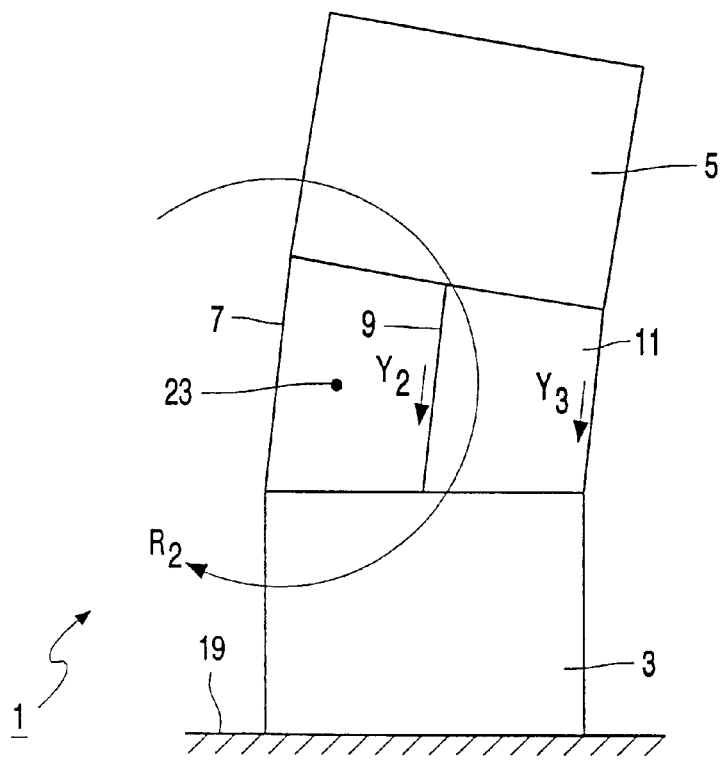
Figure 5:
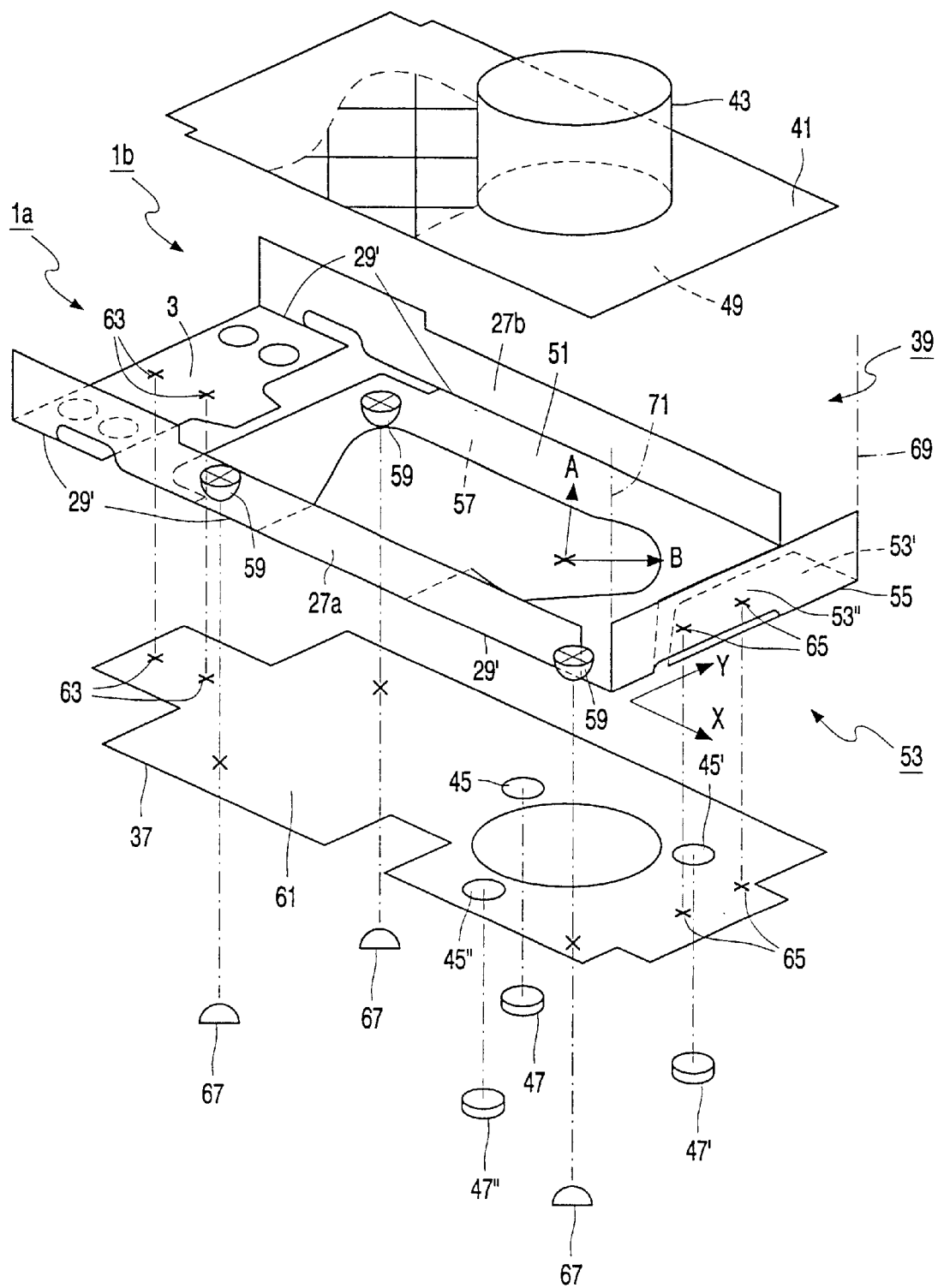

The invention will now be explained in more detail below with reference to a number of embodiments as shown in the drawing, in which FIG. 1 diagrammatically shows a first embodiment of an actuator according to the invention which is suitable for use in a method according to the invention, FIG. 2 diagrammatically shows how two parts of the actuator according to FIG. 1 are rotated relative to one another in a first direction, FIG. 3 diagrammatically shows how the two parts of the actuator according to FIG. 1 are rotated relative to one another in a second direction opposed to the first direction, FIG. 4 diagrammatically shows a second embodiment of an actuator according to the invention which is suitable for use in a method according to the invention, and FIG. 5 diagrammatically shows a portion of a device and a component therein which is to be positioned by means of a method according to the invention.

FIG. 1 diagrammatically shows a first embodiment of an actuator 1 according to the invention which is suitable for use in a method according to the invention. The actuator 1 comprises a plate-shaped first part 3 and a plate-shaped second part 5 which both extend in a main plane of the actuator 1. The two parts 3 and 5 are interconnected by means of a first bridge 7, a second bridge 9, and a third bridge 11, which also extend in said main plane and have a strip shape. In the embodiment shown, the two parts 3 and 5 and the three bridges 7, 9, and 11 are formed in that two round openings 13 and 15 were provided in a metal main plate 17. The first part 3 of the actuator 1 can be fastened to a base part 19 of a device, of which a few examples will be given further below, by means of a fastening member which is not shown in the Figure and which may be of a kind which is usual and known per se. A component (not shown) of the device, of which also a few examples will be given further below, can be fastened to the second part 5 of the actuator 1, which component is to be positioned in an accurate position relative to the base part 19 of the device by means of the actuator 1 and by a method according to the invention.

The three bridges 7, 9, 11 can each be shortened by a technique as described in detail in EP-B-0 638 895 parallel to respective shortening directions $Y_1$, $Y_2$, $Y_3$ which are substantially parallel to the main plane of the actuator 1 and to a longitudinal direction of the bridges 7, 9, 11. In this technique, a bridge 7, 9, 11 is shortened in that the bridge 7, 9, 11 is locally heated in the longitudinal direction of the bridge 7, 9, 11, as seen, for example, in the center of the bridge 7, 9, 11, by means of, for example, a laser beam.

Since the bridge 7, 9, 11 is locally heated, the material of the bridge 7, 9, 11 expands locally, so that locally a compression stress arises in the material. The heating also strongly reduces the yield point of the material, i.e. the strain limit for plastic deformation of the material, locally. The result of the created compression and the reduced yield point is that the material is locally plastically deformed substantially in directions perpendicular to the longitudinal direction of the bridge 7, 9, 11. Subsequently, the bridge 7, 9, 11 is locally cooled down again. A local shrinkage of the plastically deformed material arises as a result, so that the bridge is shortened in the longitudinal direction, i.e. parallel to the shortening direction $Y_1, Y_2, Y_3$. The shortening of the bridge 7, 9, 11 resulting from a single heating step is comparatively small, but it can be considerably increased in that a number of consecutive heating steps are applied to the bridge 7, 9, 11. Further details on this technique can be found in EP-B-0 638 895.

According to the invention, the shortening directions Y1, Y2, Y3 of the three bridges 7, 9, 11 are mutually substantially parallel. In the method according to the invention, the two parts 3 and 5 of the actuator 1 are rotated relative to one another in that two adjoining bridges 7, 9 or 9, 11 of the three bridges 7, 9, 11 are alternately shortened by the technique described above. If the first bridge 7 and the second bridge 9 are shortened, as shown diagrammatically in FIG. 2, the third bridge 11 is deformed, as seen mainly in the main plane, so that the second part 2 of the actuator 1 is rotated relative to the first part 3 in the main plane about a first axis of rotation 21 which is substantially perpendicular to the main plane and is situated between the second bridge 9 and the third bridge 11. The rotation about the first axis of rotation 21 takes place in a first direction of rotation $R_1$ which is defined by the position of the first bridge 7 and of the second bridge 9 relative to the third bridge 11. If the second bridge 9 and the third bridge 11 are shortened, as is diagrammatically shown in FIG. 3, the first bridge 7 is deformed as seen mainly in the main plane, so that the second part 5 of the actuator 1 is rotated relative to the first part 3 in the main plane about a second axis of rotation 23 which is again substantially perpendicular to the main plane and is situated between the first bridge 7 and the second bridge 9. The rotation about the second axis of rotation 23 takes place in a second direction of rotation $R_2$ which is defined by the position of the second bridge 9 and of the third bridge 11 relative to the first bridge 7 and is opposed to the first direction of rotation $R_1$. The two parts 3 and 5 of the actuator 1 can thus be rotated relative to one another in two mutually opposed directions of rotation $R_1$ and $R_2$. Since each heating step applied to a bridge 7, 9, 11 leads to only a comparatively small shortening of the relevant bridge 7, 9, 11 and accordingly to a comparatively small mutual rotation of the two parts 3 and 5, a very accurate, stepwise mutual rotation of the two parts 3 and 5 can be achieved by the method. The accuracy of the mutual rotation of the two parts 3 and 5 is increased in that the actuator 1 is very rigid, seen in the main plane.

Shortening of the two mutually adjoining bridges 7, 9 or 9, 11 gives rise to a tensile stress in the two bridges 7, 9 or 9, 11 which increases in proportion as the two bridges 7, 9 or 9, 11 are further shortened. Since the two mutually adjoining bridges 7, 9 or 9, 11 are alternately shortened in the method according to the invention, a tensile stress can be built up in the two bridges 7, 9 or 9, 11 which is greater than the lowered yield point which the material of the bridges 7, 9, 11 has during the heating step. FIG. 2 shows a situation, for example, where a tensile stress $T_2$ and a tensile stress $T_3$ are present in the second bridge 9 and in the third bridge 11, respectively, which stresses are greater than said yield point. If the second bridge 9 is locally heated, the yield point of the material in the second bridge 9 will decrease locally, so that the second bridge 9 is locally plastically deformed under the influence of the tensile stress $T_2$, i.e. is lengthened. Said plastic deformation resulting from the tensile stress $T_2$, however, is very small because the tensile stress $T_3$ in the third bridge 11 rises strongly already upon a very small lengthening of the second bridge 9 owing to elastic deformation of the third bridge 11. The third bridge 11 thus absorbs the tensile stress $T_2$ present in the second bridge 9 for a major portion, so that a further lengthening of the second bridge 9 is prevented and a local plastic deformation of the second bridge 9 perpendicular to the longitudinal direction of the second bridge 9 arises through expansion of the heated material. When the second bridge 9 is subsequently cooled down, the plastically deformed material will shrink, whereby the second bridge 9 is shortened in longitudinal direction. This causes the tensile stress in the second bridge 9 to rise again, so that the third bridge 11 is partly relieved again of its stress again. Since a tensile stress can be built up in the two bridges 9, 11 in this manner which is much greater than said lowered yield point, the two bridges 9, 11 can be shortened to a comparatively great extent, so that the two parts 3 and 5 are rotatable relative to one another through a comparatively great angle.

As FIG. 1 shows, the actuator 1 is further provided with a coupling member 25 which, seen in a direction parallel to the shortening directions $Y_1, Y_2, Y_3$, is situated at a distance H from the three bridges 7, 9, 11. The coupling member 25 comprises a blade spring 27 which extends substantially parallel to an X-direction which is perpendicular to the shortening directions $Y_1, Y_2, Y_3$. Furthermore, the blade spring 27 is substantially perpendicular to the main plane of the actuator 1. The blade spring 27 was manufactured together with the main plate 17 mentioned above, from which the two parts 3 and 5 and the three bridges 7, 9, 11 are made, from one single piece of sheeting, the blade spring 27 being bent from the main plane into a position substantially perpendicular to the main plane about a bending line 29 which extends parallel to the X-direction. The blade spring 27 is thus fastened in a fixed position, seen parallel to the X-direction, to the second part 5 of the actuator 1. Since an end 31 of the blade spring 27 has a comparatively low rigidity relative to the second part 5 in a direction parallel to the shortening directions $Y_1, Y_2, Y_3$, the coupling member 25 is uncoupled from the second part 5 as seen in the directions of rotation $R_1, R_2$ of the actuator 1. The fact that the blade spring 27 is fastened in a fixed position to the second part 5, seen parallel to the X-direction, and is uncoupled from the second part 5 in the rotation directions $R_1, R_2$ implies that a rotation of the second part 5 relative to the first part 3 is converted via the coupling member 25 into a translation of the end 31 of the blade spring 27 parallel to the X-direction. Since the two parts 3, 5 of the actuator 1 are rotatable relative to one another in two mutually opposed directions $R_1, R_2$, the end 31 of the blade spring 27 can similarly be displaced in a direction X' opposed to the X-direction. A transmission ratio obtains between the translatory movement of the end 31 and the relative rotational movement of the two parts 3 and 5, which ratio is defined by said distance H between the blade spring 27 and the three bridges 7, 9, 11 and which increases in proportion as the distance H increases.

FIG. 1 shows two further dimensions which characterize the actuator 1, i.e. a width W which the bridges 7, 9, 11 have, as seen perpendicularly to the shortening directions $Y_1$, $Y_2$, $Y_3$, and a distance D present between the bridges 7, 9, 11. Said width W is preferably substantially smaller than twice a spot diameter of a laser beam to be used for shortening the bridges 7, 9, 11. It is achieved thereby that a comparatively large portion of the bridges 7, 9, 11, as seen in the width direction, is heated by the laser beam, so that a comparatively great shortening of the bridges 7, 9, 11 is achieved during a single heating step. The actuator 1 has a high effectivity as a result of this. The effectivity of the actuator 1 is further enhanced when the width W of the bridges 7, 9, 11 is equal to or smaller than said spot diameter, which means that the bridges 7, 9, 11 are uniformly heated by the laser beam, seen in the width direction. Said distance D between the bridges 7, 9, 11 has an order of magnitude in the actuator 1 which is equal to an order of magnitude of the width W of the bridges 7, 9, 11. A ratio between said distance D and width W defines a ratio between a mutual angle of rotation of the two parts 3 and 5 and a shortening of the two mutually adjacent bridges 7, 9 or 9, 11. Given a predetermined value of the shortening of the mutually adjoining bridges 7, 9 or 9, 11, the mutual angle of rotation of the two parts 3 and 5 is greater in proportion as the ratio between the distance D and the width W is smaller.

FIG. 4 diagrammatically shows a second embodiment of an actuator 1' according to the invention which is suitable for use in a method according to the invention. Components of the actuator 1' corresponding to components of the actuator 1 discussed above have been given the same reference numerals in FIG. 4. In the actuator 1', a distance D' is present between the bridges 7, 9, 11 which is substantially greater than the width W of the bridges 7, 9, 11. Said distance D' is achieved through the application of two elongate slots 33 and 35 in the main plate 17 which extend perpendicularly to the shortening directions $Y_1$, $Y_2$, $Y_3$. A comparatively small ratio is obtained thereby between the mutual angle of rotation of the two parts 3 and 5 and the shortening of the mutually adjoining bridges 7, 9 or 9, 11, so that only a comparatively small, but comparatively highly accurate mutual rotation of the two parts 3 and 5 of the actuator 1' is obtained upon a shortening of the bridges.

FIG. 5 diagrammatically shows a portion of a device, in particular a playback device for optical discs. The FIG. shows an auxiliary plate 37, a manipulator 39, and a printed circuit board 41 on which a photodiode 43 is fastened as part of this device. The auxiliary plate 37 is fastened in three locations 45, 45', and 45", to three fastening points 47, 47', and 47" of, for example, a displaceable slide or a main frame of the playback device, which is not shown in FIG. 5 for reasons of simplicity. The printed circuit board 41 is glued by a lower side 49 to a carrier plate 51 of the manipulator 39, which carrier plate extends parallel to an X-direction and parallel to a Y-direction. As FIG. 5 shows, the manipulator 39 comprises two actuators 1a and 1b according to the invention which are provided with a common first part 3. The two blade springs 27a, 27b of the actuators 1a, 1b are fastened to the carrier plate 51 and extend substantially parallel to the X-direction and perpendicularly to the carrier plate 51. Furthermore, the manipulator 39 comprises a third blade spring 53 which extends substantially parallel to the Y-direction and which comprises a horizontal portion 53' and a vertical portion 53", said vertical portion 53" being fastened to the carrier plate 51. The manipulator 39 is manufactured from a single piece of sheeting, the blade springs 27a, 27b of the actuators 1a, 1b and the vertical portion 53" of the third blade spring 53 being bent from a main plane of said piece of sheeting about respective bending lines 29' and 55. The carrier plate 51 is provided with three support elements 59 at a lower side 57, by means of which elements the carrier plate 51 rests on an upper side 61 of the auxiliary plate 37. The carrier plate 51 is fastened to the auxiliary plate 37 by means of two welded joints 63 between the upper side 61 of the auxiliary plate 37 and the common first part 3 of the actuators 1a, 1b, and by means of two further welded joints 65 between the upper side 61 of the auxiliary plate 37 and the horizontal portion 53' of the third blade spring 53. To prevent sagging of the auxiliary plate 37, the auxiliary plate 37 rests on three support elements 67 of said slide or said main frame, which elements are provided perpendicularly below the support elements 59 of the manipulator 39. The photodiode 43 can be positioned by means of the actuators 1a, 1b by a method according to the invention relative to said slide or said main frame in directions parallel to the X-direction and parallel to the Y-direction, during which the carrier plate 51 slides over the upper side 61 of the auxiliary plate 37 by means of the three support elements 59. When the blade spring 27a of the actuator 1a is displaced parallel to the X-direction, the carrier plate 51 is rotated about an axis of rotation 69 which coincides substantially with an imaginary line of intersection of the blade springs 27b and 53", such that the photodiode 43 is displaced in a direction A lying in the main plane of the manipulator 39, as shown in FIG. 5. When the blade spring 27b of the actuator 1b is displaced parallel to the X-direction, the carrier plate 51 is rotated about an axis of rotation 71 which coincides substantially with an imaginary line of intersection of the blade springs 27a and 53", so that the photodiode 43 is displaced in a direction B also lying in the main plane of the manipulator 39 as shown in FIG. 5. The photodiode 43 is thus capable of being positioned into a desired position parallel to the X-direction and the Y-direction through a suitable combination of displacements in said directions A and B.

A method and an actuator according to the invention may also be used for positioning other components in a playback unit for optical discs such as, for example, lenses, and also for positioning components in devices of a different kind. Examples of this are the positioning of an image sensor in an image recording device, or positioning of a magnetic scanning unit in a scanning device for magnetic information carriers. The bridges of an actuator according to the invention may also be heated in a manner other than by means of a laser beam in a method according to the invention, for example by means of a local electric current. The invention also covers embodiments of an actuator without means for converting the mutual rotation of the two parts into a translation, or with means for converting said rotation into a translation in a direction differing from the X-direction perpendicular to the shortening directions of the bridges as mentioned above. The means for converting said rotation into a translation, moreover, may be constructed in a different manner, for example in that a rigid rod is used instead of said blade spring, which rod is pivotably fastened to the second part of the actuator.

What is claimed is:

1. An actuator provided with:
    two parts which extend in a main plane; and
    three bridges that interconnect the two parts, which three bridges can each be shortened in a shortening direction extending parallel to the main plane through local heating and subsequent cooling down, while the two parts are rotatable relative to one another about an axis of rotation extending substantially perpendicularly to the main plane through shortening of at least one of said three bridges, and wherein the shortening directions of the three bridges are mutually substantially parallel, and the two parts can be rotated relative to one another by an alternate shortening of two mutually adjoining bridges of the three bridges.

2. The actuator of claim 1, wherein the bridges have a width, seen perpendicularly to the shortening direction, which is substantially smaller than twice a spot diameter of a laser beam used or designed to be used for shortening the bridges.

3. The actuator of claim 2, wherein the width of the bridges is at most equal to the spot diameter.

4. The actuator of claim 1, wherein a distance present between the bridges and the width of the bridges have a same order of magnitude.

5. The actuator of claim 1, wherein a distance present between the bridges is substantially greater than the width of the bridges.

6. The actuator of claim 1, wherein the actuator is further provided with a coupling member which is fastened to one of the two parts of the actuator at a distance from the bridges as seen parallel to the shortening direction and positioned in a displacement direction directed substantially perpendicularly to the shortening direction, which coupling member is uncoupled from the part to which the actuator is attached during movement about the axis of rotation of the actuator.

7. The actuator of claim 6, wherein the coupling member includes a blade spring which extends substantially parallel to the displacement direction and substantially perpendicularly to the main plane.

8. The actuator of claim 7, wherein the two parts of the actuator, the three bridges, and the blade spring are manufactured from a single piece of sheeting, the blade spring being bent from the main plane into a position substantially perpendicular to the main plane.

9. The actuator of claim 1 wherein the axis of rotation is located relative to one of the three bridges that is a center bridge, the center bridge being located between another two of the three bridges.

10. The actuator of claim 1 wherein the axis of rotation is relative to a center or one of the three bridges that is located between another two of the three bridges and a midpoint of one of the three bridges that is not currently being shortened.

11. An actuator comprising:
a main plane divided into a first part and a second part;
a series of three bridges connecting the first part and the second part, wherein each of the three bridges can be shortened in a shortening direction extending parallel to the main plane through local heating and subsequent cooling, the first part and the second part being rotatable relative to each other about an axis of rotation extending substantially perpendicularly to the main plane through selective shortening of the three bridges; and
wherein one of the three bridges is a central bridge positioned between two of the three bridges and the axis of rotation is relative to a central portion of the central bridge.

12. The actuator of claim 11, wherein the two parts can be rotated relative to one another by alternate shortening of two mutually adjoining bridges of the three bridges.

13. The actuator of claim 11 wherein the axis of rotation in addition to being relative to the central portion of the central bridge, is also relative to a midpoint of one of the three bridges that is not currently being shortened.

14. The actuator of claim 11, wherein the three bridges have a width, seen perpendicularly to the shortening direction, which is substantially smaller than twice a spot diameter of a laser beam used or designed to be used for shortening the bridges.

15. The actuator of claim 11, wherein the three bridges have a width, seen perpendicularly to the shortening direction, is at most equal to the spot diameter.

16. The actuator of claim 11, wherein a distance between the bridges and a width of the three bridges seen perpendicularly to the shortening direction, have a same order of magnitude.

17. The actuator of claim 11, wherein a distance between the bridges is substantially greater than a width of the three bridges as seen perpendicularly to the shortening direction.

18. The actuator of claim 11, wherein the actuator is further provided with a coupling member which is fastened to one of the two parts of the actuator at a distance from the bridges as seen parallel to the shortening direction and positioned in a displacement direction directed substantially perpendicularly to the shortening direction, which coupling member is uncoupled from the part to which the actuator is attached during movement about the axis of rotation direction of the actuator.

19. The actuator of claim 18, wherein the coupling member includes a blade spring that extends substantially parallel to the displacement direction and substantially perpendicularly to the main plane.

20. The actuator of claim 19, wherein the two parts of the actuator, the three bridges, and the blade spring are manufactured from a single piece of sheeting, the blade spring being bent from the main plane into a position substantially perpendicular to the main plane.

* * * * *